US012771821B2

(12) United States Patent
Ye et al.

(10) Patent No.: US 12,771,821 B2
(45) Date of Patent: Oct. 20, 2026

(54) MULTI-HYPOTHESIS CROSS COMPONENT PREDICTION MODELS

(71) Applicant: Tencent America LLC, Palo Alto, CA (US)

(72) Inventors: Jing Ye, Palo Alto, CA (US); Xin Zhao, Palo Alto, CA (US); Liang Zhao, Palo Alto, CA (US); Han Gao, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 87 days.

(21) Appl. No.: 18/803,213

(22) Filed: Aug. 13, 2024

(65) Prior Publication Data

US 2025/0240403 A1 Jul. 24, 2025

Related U.S. Application Data

(60) Provisional application No. 63/622,535, filed on Jan. 18, 2024.

(51) Int. Cl.
*H04N 19/105* (2014.01)
*H04N 19/159* (2014.01)
(Continued)

(52) U.S. Cl.
CPC ......... *H04N 19/105* (2014.11); *H04N 19/159* (2014.11); *H04N 19/176* (2014.11); *H04N 19/186* (2014.11); *H04N 19/70* (2014.11)

(58) Field of Classification Search
CPC .. H04N 19/105; H04N 19/159; H04N 19/176; H04N 19/186; H04N 19/593; H04N 19/70
See application file for complete search history.

(56) References Cited

U.S. PATENT DOCUMENTS

| | | | | |
|---|---|---|---|---|
| 2021/0385439 A1* | 12/2021 | Zhu | ...................... | H04N 19/105 |
| 2025/0039437 A1* | 1/2025 | Jhu | ...................... | H04N 19/105 |

(Continued)

FOREIGN PATENT DOCUMENTS

| | | | | |
|---|---|---|---|---|
| WO | WO-2025042869 A1 * | 2/2025 | ............. | H04N 19/82 |
| WO | WO-2025049984 A2 * | 3/2025 | ........... | H04N 19/107 |

OTHER PUBLICATIONS

"Enhanced Cross-Component Linear Model for Chroma Intra-Prediction in Video Coding"—Zhang et al., IEEE Transactions On Image Processing, vol. 27, No. 8, Aug. 2018. (Year: 2018).*

(Continued)

*Primary Examiner* — Mainul Hasan
(74) *Attorney, Agent, or Firm* — Morgan, Lewis & Bockius LLP

(57) ABSTRACT

The various implementations described herein include methods and systems for coding video. In one aspect, a video bitstream includes a current coding block of an image frame and signals a syntax element for a multi-hypothesis cross-component prediction (MH-CCP) mode. The syntax element indicates whether to reconstruct a first chroma sample of the current coding block based on a first luma sample and associated neighboring luma samples. The first luma sample is collocated with the first chroma sample. A computing system identifies the first luma sample and one or more neighboring luma samples in the current coding block, generates a plurality of nonlinear terms based on at least a subset of the first luma sample and the one or more neighboring luma samples, predicts the first chroma sample based on the plurality of nonlinear terms, and reconstructs the current image frame including the current coding block.

22 Claims, 9 Drawing Sheets

(51) Int. Cl.

| | |
|---|---|
| ***H04N 19/176*** | (2014.01) |
| ***H04N 19/186*** | (2014.01) |
| ***H04N 19/70*** | (2014.01) |

(56) References Cited

U.S. PATENT DOCUMENTS

2025/0063155 A1* 2/2025 Chiang ................ H04N 19/105
2025/0071331 A1* 2/2025 Tsai ....................... H04N 19/70

OTHER PUBLICATIONS

"Joint Cross-Component Linear Model For Chroma Intra Prediction"—Ghaznavi-Youvalari et al., 2020 IEEE 22nd International Workshop on Multimedia Signal Processing (MMSP); Sep. 21-24, 2020. (Year: 2020).*

"Cross-Component Prediction Boosted With Local and Non-Local Information in Video Coding"—Zhang et al., IEEE Transactions On Image Processing, vol. 33, 2024 (Year: 2024).*

* cited by examiner $$\text{predChromaVal} = \sum_{i=0}^{Num} w_i \cdot S_i + w_p \cdot P + w_B \cdot B$$

$$w_p \cdot P = \sum_{i=0}^{N} w_{Pi} \cdot P_i$$

MULTI-HYPOTHESIS CROSS COMPONENT PREDICTION MODELS

RELATED APPLICATIONS

This application claims priority to U.S. Provisional Patent Application No. 63/622,535, entitled "Multi-Hypothesis Cross Component Prediction Model," filed Jan. 18, 2024, which is hereby incorporated by reference in its entirety.

TECHNICAL FIELD

The disclosed embodiments relate generally to video coding, including but not limited to systems and methods for processing video data using multi-hypothesis cross-component prediction (MH-CCP).

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. The video coding can be performed by hardware and/or software on an electronic/client device or a server providing a cloud service.

Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality. Multiple video codec standards have been developed. For example, High-Efficiency Video Coding (HEVC/H.265) is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC/H.266) is a video compression standard intended as a successor to HEVC. ITU-T and ISO/IEC published the VVC/H.266 standard in 2020 (version 1) and 2022 (version 2). AOMedia Video 1 (AV1) is an open video coding format designed as an alternative to HEVC. On Jan. 8, 2019, a validated version 1.0.0 with Errata 1 of the specification was released.

SUMMARY

As mentioned above, encoding (compression) reduces the bandwidth and/or storage space requirements. As described in detail later, both lossless compression and lossy compression can be employed. Lossless compression refers to techniques where an exact copy of the original signal can be reconstructed from the compressed original signal via a decoding process. Lossy compression refers to coding/decoding process where original video information is not fully retained during coding and not fully recoverable during decoding. When using lossy compression, the reconstructed signal may not be identical to the original signal, but the distortion between original and reconstructed signals is made small enough to render the reconstructed signal useful for the intended application. The amount of tolerable distortion depends on the application. For example, users of certain consumer video streaming applications may tolerate higher distortion than users of cinematic or television broadcasting applications. The compression ratio achievable by a particular coding algorithm can be selected or adjusted to reflect various distortion tolerance: higher tolerable distortion generally allows for coding algorithms that yield higher losses and higher compression ratios.

The present disclosure describes video compression methods using intra prediction. A linear or nonlinear weighted sum of multiple inputs of luma samples is used to predict a chroma sample, e.g., in multi-hypothesis cross-component prediction (MH-CCP). The multiple inputs of luma samples includes a luma sample C that is co-located with the chroma sample and a filtered luma sample that is determined based on neighboring luma samples and applied as a filtering input. Each filtering input to a weighted sum is called a hypothesis, and is fed into the least mean square calculation kernel. In other words, multiple inputs may include multiple reconstructed luma samples that are located around a co-located position and a non-linear term of the reconstructed luma sample. Some implementations of this application are directed to applying a plurality of nonlinear terms in MH-CCP, and each nonlinear term is formed based on a subset of a luma sample collocated with the chroma sample and one or more associated neighboring luma samples.

In some embodiments, a sample of a second color component is predicted as a linear or nonlinear weighted sum of multiple inputs determined based on a sample of a first color component, which is collocated with the sample of the second color component, and one or more associated neighboring samples of the first color component according to a multi-tap model associated with MH-CCP. The multi-tap model includes a number (N) of taps, which are selected from the collocated sample of the first color component, the one or more associated neighboring samples of the second color component, a plurality of nonlinear terms, and an offset term. The multi-tap model corresponds to the same number (N) of selected terms combined to determine the sample of the second color component. Some implementations of this application are directed to applying a plurality of nonlinear terms in MH-CCP, and each nonlinear term is formed based on a subset of the sample of the first color component and one or more associated neighboring samples.

In some embodiments, the sample of the first color component is a luma sample, and the sample of the second color component is a blue-difference chroma (Cb) sample or a red-difference chroma (Cr) component. For example, the chroma sample is a weighted combination of terms selected from a respective collocated luma sample, one or more neighboring luma sample, the nonlinear terms, and the offset term. Alternatively, in some embodiments, the first color component is one of the red, green, and blue colors, and the second color component is another one of the red, green, and blue colors. Alternatively, in some embodiments, the first color component and the second component correspond to a color format that is distinct from a YCbCr color format and an RGB color format.

In accordance with some embodiments, a method of video decoding is provided. The method includes receiving a video bitstream including a current coding block of a current image frame, and the video bitstream includes a first syntax element for a multi-hypothesis cross-component prediction (MH-CCP) mode. The method further includes, based on the first syntax element, determining that the MH-CCP mode is enabled to reconstruct a first chroma sample of the current coding block based on at least a first luma sample and associated neighboring luma samples. The first luma sample is collocated with the first chroma sample. The method further includes identifying the first luma sample and one or more neighboring luma samples in the current coding block; generating a plurality of nonlinear terms based on at least a subset of the first luma sample and the one or more neighboring luma samples; predicting the first chroma sample collocated with the first luma sample in the current coding block based on the plurality of nonlinear terms; and reconstructing the current image frame including the current coding block.

In accordance with some embodiments, a method of video encoding is provided. The method includes receiving video data comprising a current coding block of a current image frame, encoding the current image frame, transmitting the encoded current image frame via a video bitstream, and signaling, via the video bitstream, a first syntax element for a multi-hypothesis cross-component prediction (MH-CCP) mode indicating whether to reconstruct a first chroma sample of the current coding block based on a first luma sample and associated neighboring luma samples. The first luma sample is collocated with the first chroma sample. When the MH-CCP mode is enabled, a plurality of nonlinear terms are determined based on at least a subset of the first luma sample and one or more neighboring luma samples of the first luma sample, and the first chroma sample collocated with the first luma sample is predicted based on the plurality of nonlinear terms.

In accordance with some embodiments, a method of bitstream conversion is provided. The method includes obtaining a source video sequence including a current image frame having a current coding block and performing a conversion between the source video sequence and a video bitstream. The video bitstream includes the current image frame having the current coding block and a first syntax element for a multi-hypothesis cross-component prediction (MH-CCP) mode indicating whether to reconstruct a first chroma sample of the current coding block based on a first luma sample and associated neighboring luma samples. The first luma sample is collocated with the first chroma sample. When the MH-CCP mode is enabled, a plurality of nonlinear terms are determined based on at least a subset of the first luma sample and one or more neighboring luma samples of the first luma sample, and the first chroma sample collocated with the first luma sample is predicted based on the plurality of nonlinear terms.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and a decoder component (e.g., a transcoder).

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for encoding and decoding video. Such methods, devices, and systems may complement or replace conventional methods, devices, and systems for video encoding/decoding. The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

In accordance with common practice, the various features illustrated in the drawings are not necessarily drawn to scale, and like reference numerals can be used to denote like features throughout the specification and figures.

DETAILED DESCRIPTION

The present disclosure describes cross component intra prediction of video data in a MH-CCP mode where each of a plurality of samples of a second color component is determined based on one or more associated samples of a first color component. The MH-CCP mode corresponds to a multi-tap model that includes a number (N) of taps. Each tap is selected from a collocated sample of the first color component, the one or more associated neighboring samples of the first color component, a plurality of nonlinear terms, and an offset term. The selected taps are combined in a weighted manner to determine the sample of the second color component. In some embodiments, the sample of the first color component is a luma sample, and the sample of the second color component is a chroma sample. For example, the chroma sample is a weighted combination of terms selected from a respective collocated luma sample, one or more neighboring luma sample, the plurality of nonlinear terms, and the offset term. When the syntax element indicates that the MH-CCP mode is enabled, the plurality of nonlinear terms are determined based on at least a subset of the collocated luma sample and one or more neighboring luma samples of the collocated luma sample, and the chroma sample is predicted based on the plurality of nonlinear terms. In the MH-CCP mode, samples of the second color component of a current coding block do not need to be transmitted in a video bitstream, thereby conserving a communication bandwidth of a video codec. Additionally, the MH-CCP involves multiple nonlinear terms, and can provide a high level of accuracy for sample values compared with a single nonlinear term.

Figure 1:
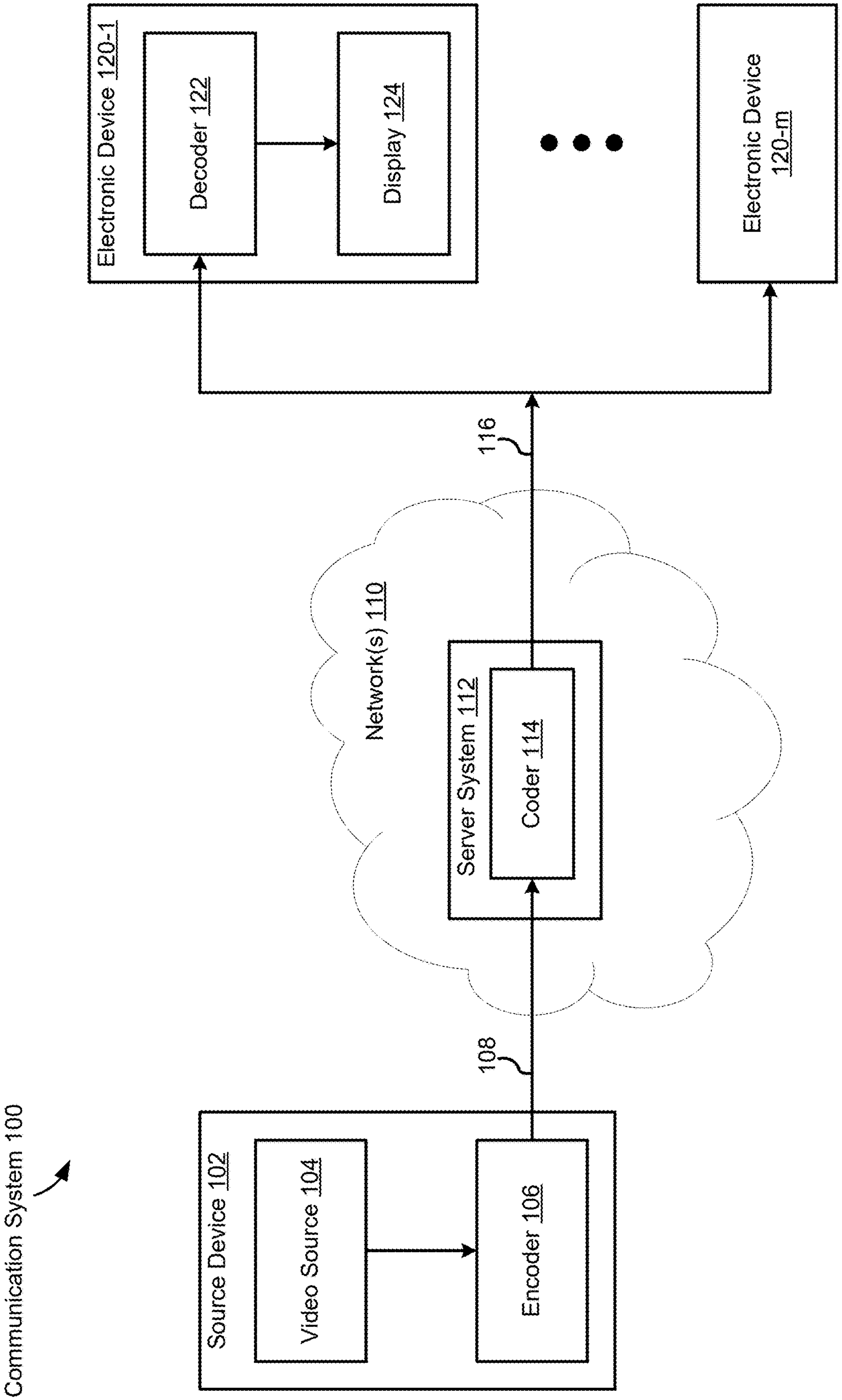
FIG. 1 is a block diagram illustrating an example communication system in accordance with some embodiments.

FIG. 1 is a block diagram illustrating a communication system 100 in accordance with some embodiments. The communication system 100 includes a source device 102 and a plurality of electronic devices 120 (e.g., electronic device 120-1 to electronic device 120-*m*) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108. In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 and optionally display the video pictures.

Figure 2A:
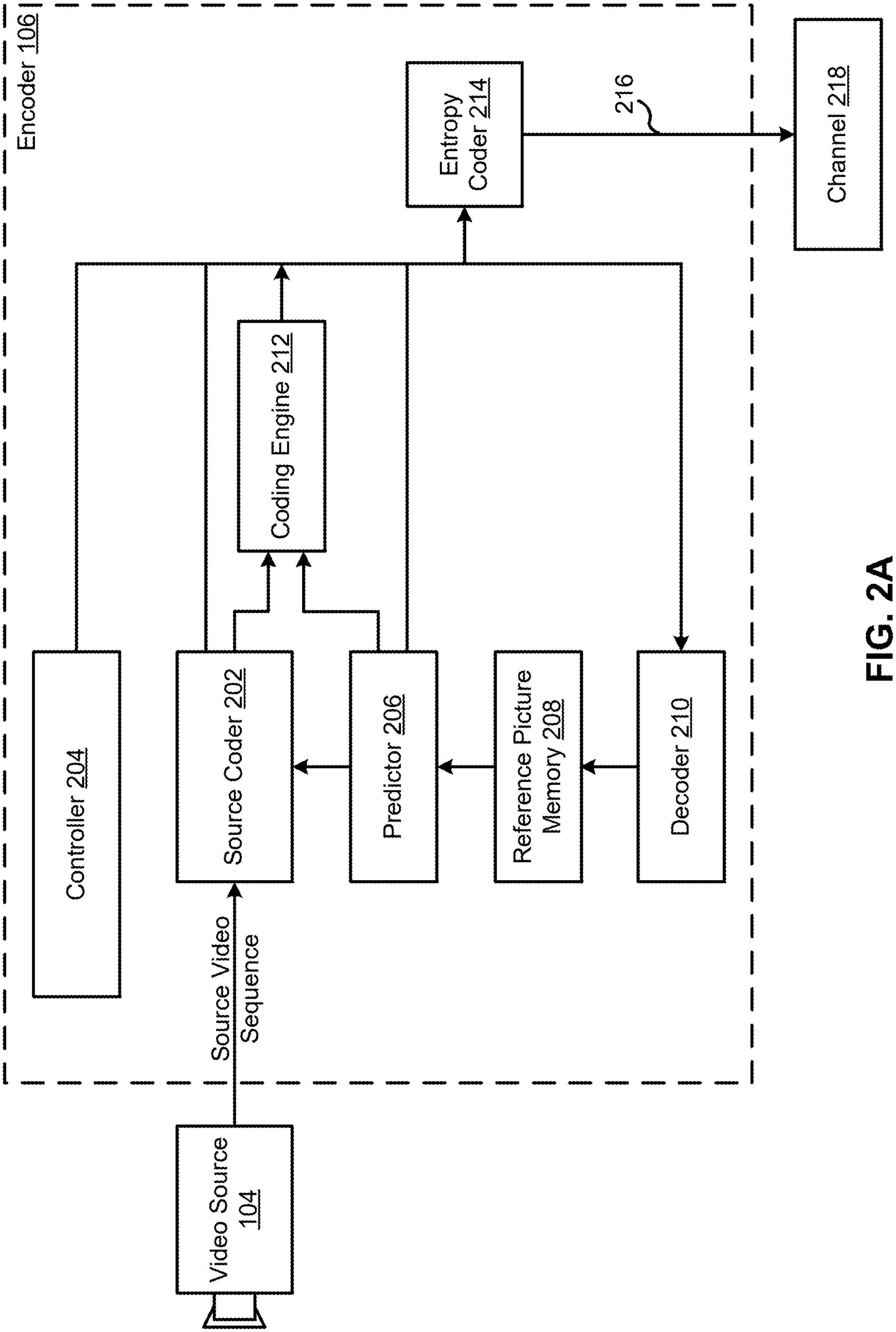
FIG. 2A is a block diagram illustrating example elements of an encoder component in accordance with some embodiments.

FIG. 2A is a block diagram illustrating example elements of the encoder component 106 in accordance with some embodiments. The encoder component 106 receives video data (e.g., a source video sequence) from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video.

In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples.

The encoder component 106 is configured to code and/or compress the pictures of the source video sequence into a coded video sequence 216 in real-time or under other time constraints as required by the application. In some embodiments, the encoder component 106 is configured to perform a conversion between the source video sequence and a bitstream of visual media data (e.g., a video bitstream). Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture (s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

The decoder technology described herein, except the parsing/entropy decoding, may be to be present, in substantially identical functional form, in a corresponding encoder. For this reason, the disclosed subject matter focuses on decoder operation. The description of encoder technologies can be abbreviated as they may be the inverse of the decoder technologies.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. As determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
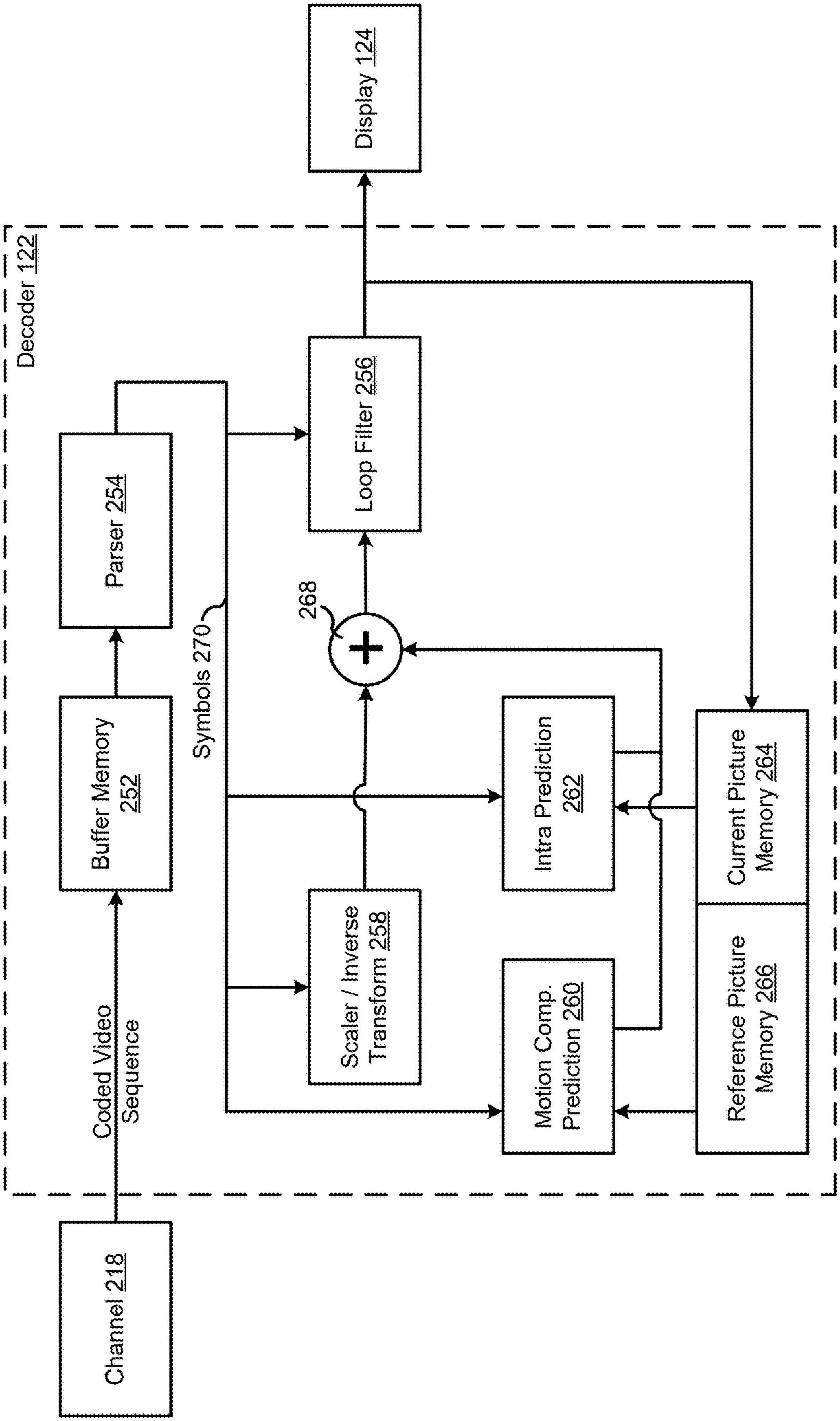
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, for example, temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. The decoder component 122 may be implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and/or of adaptive size, and may at least partially be implemented in an operating system or similar elements outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

The decoder component 122 can be conceptually subdivided into a number of functional units, and in some implementations, these units interact closely with each other and can, at least partly, be integrated into each other. However, for clarity, the conceptual subdivision of the functional units is maintained herein.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation also can include interpolation of sample values as fetched from the reference picture memory 266 when sub-sample exact motion vectors are in use, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values. The output of the loop filter unit 256 can be a sample stream that can be output to a render device such as the display 124, as well as stored in the reference picture memory 266 for use in future inter-picture prediction.

Certain coded pictures, once reconstructed, can be used as reference pictures for future prediction. Once a coded picture is reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
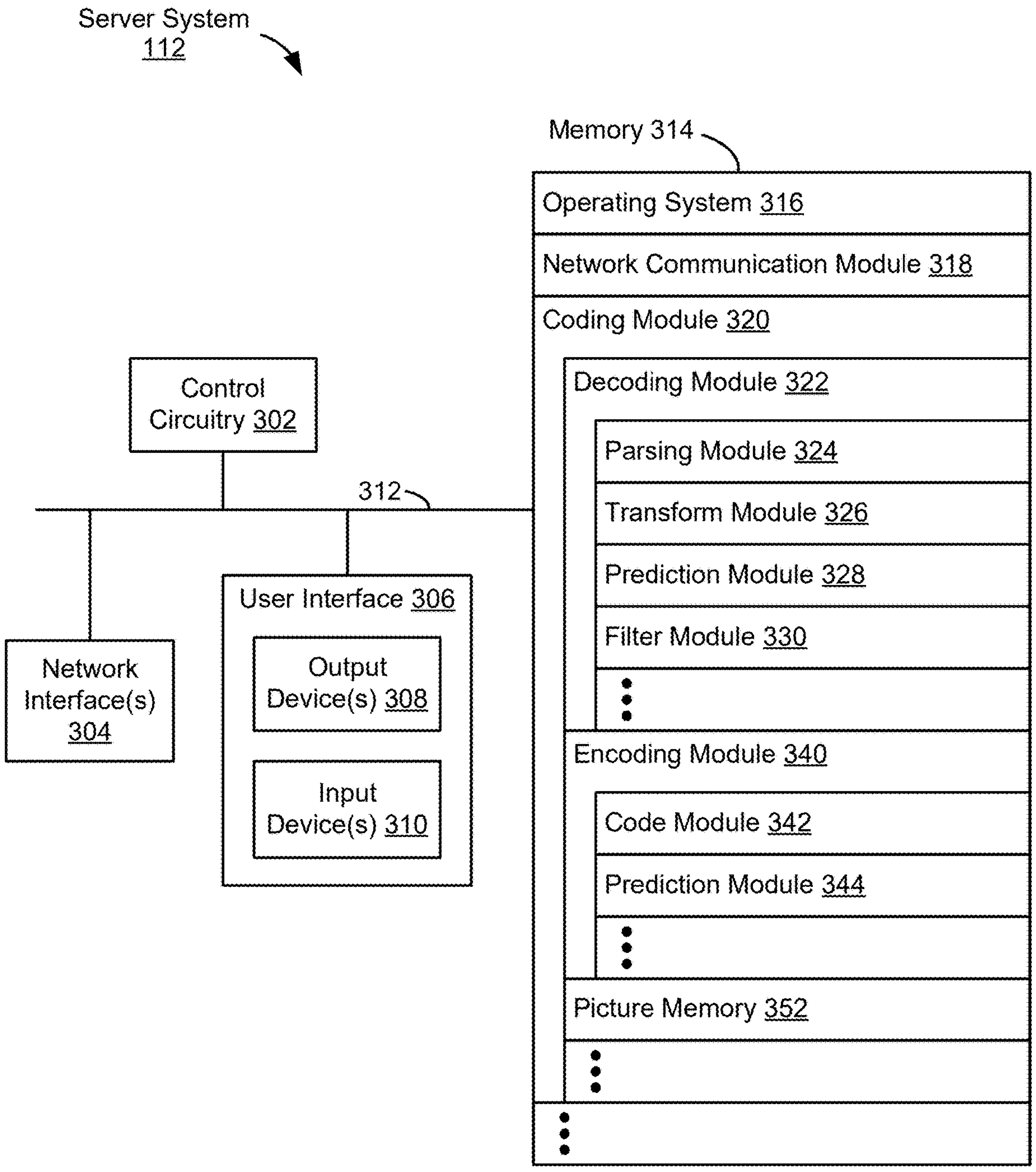
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes one or more field-programmable gate arrays (FPGAs), hardware accelerators, and/or one or more integrated circuits (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
  - a decoding module 322 for performing various functions with respect to decoding encoded data, such as those described previously with respect to the decoder component 122; and
  - an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above, such as an audio processing module.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Figure 4:
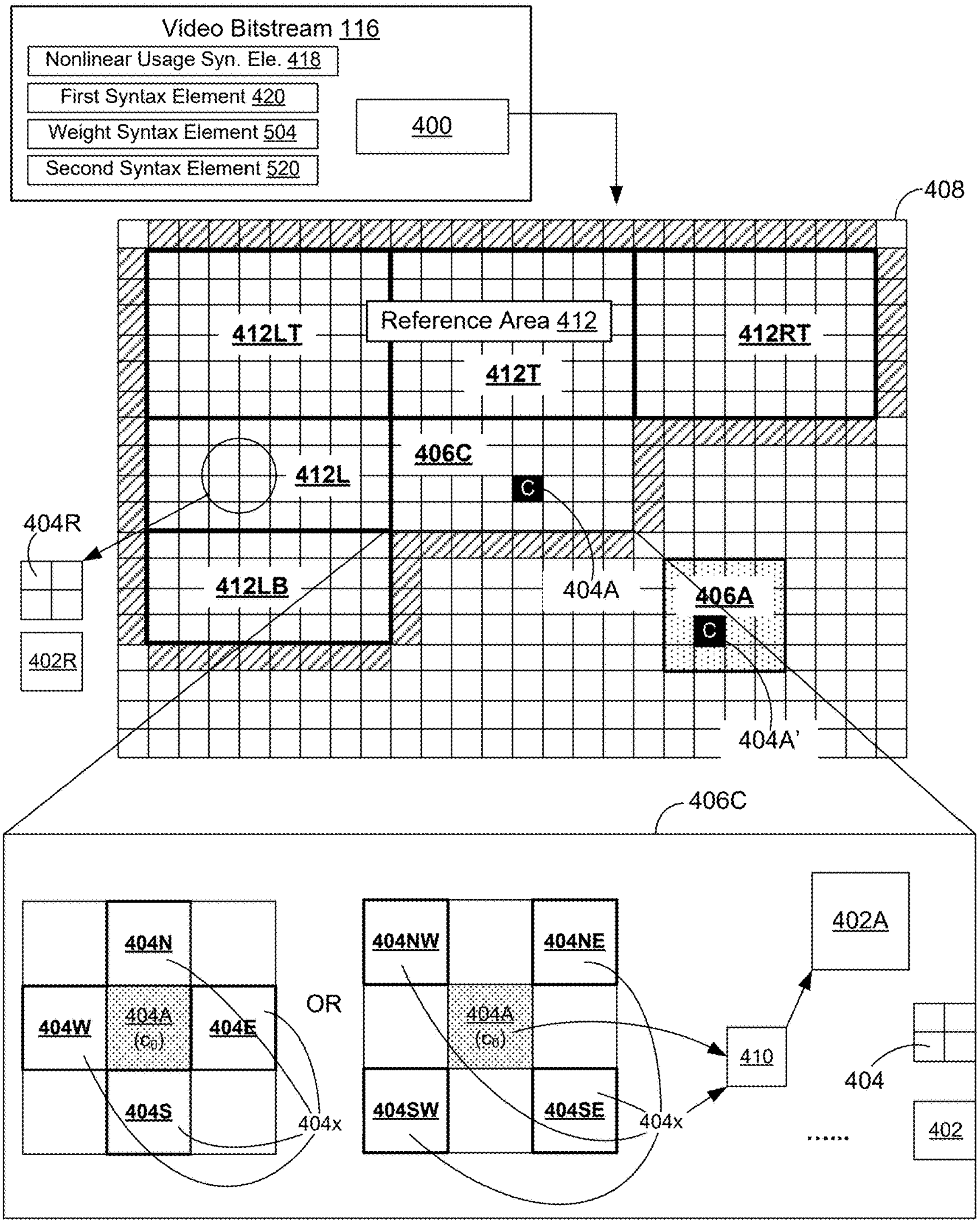
FIG. 4 illustrates an example scheme for generating a first chroma sample from a plurality of luma samples in an MH-CCP mode, in accordance with some embodiments.

FIG. 4 illustrates an example scheme 400 for generating a first chroma sample 402A from a plurality of luma samples 404 (e.g., 404A and 404X) in an MH-CCP mode, in accordance with some embodiments. In some embodiments, a current coding block 406C of a current image frame 408 is coded in a cross-component intra prediction (CCIP) mode. In the CCIP mode, a decoder 122 (FIG. 2B) determines each of a plurality of chroma samples 402 of the current coding block 406C based on one or more luma samples 404 that have been reconstructed. In some situations, the CCIP mode includes a cross-component linear model mode (CCLM) in which a first chroma sample 402A is converted from a reconstructed luma sample 404A that is co-located with the chroma sample 402A based on a linear model. Alternatively, in some situations, the CCIP mode includes a convolutional cross-component mode (CCCM) in which a first chroma sample 402A is predicted directly from a plurality of reconstructed luma samples 404X that is located adjacent to the first luma sample 404A based on a filter shape of a filter.

Alternatively and additionally, in some situations, the CCIP mode includes the MH-CCP mode in which a first chroma sample 402A is generated by combining at least the first luma sample 404A that is collocated with the first chroma sample 402A and a plurality of hypothesis values using a plurality of weighing factors. The plurality of neighboring luma samples 404X of the first luma sample 404A are combined using a plurality of coefficients to generate the plurality of hypothesis values.

In other words, in some embodiments associated with the MH-CCP mode, the first luma sample 404A and the plurality of neighboring luma samples 404X are combined using a plurality of model parameters 410 (which are associated with the weighing factors and the coefficients) to generate the first chroma sample 402A. The first chroma sample 402A is a blue-difference chroma (Cb) sample or a red-difference chroma (Cr) component. In some embodiments, a video bitstream 116 includes the current coding block 406C of the current image frame 408 and a first syntax element 420 for the MH-CCP mode. The first syntax element 420 indicates whether to reconstruct the first chroma sample 402A of the current coding block 406C by combining a set of luma samples 404 including a first luma sample 404A based on a plurality of model parameters 410. In some embodiments, the first syntax element 420 is signaled in the video bitstream 116 at one of a block level, a superblock level, an image frame level, a slice level, a tile level, and an image sequence level for the current coding block 406C.

In some embodiments, a video bitstream 116 includes a first syntax element 420 for the MH-CCP mode. The first chroma sample 402A of the current coding block 406C is configured to be generated by combining at least the first luma sample 404A that is co-located with the first chroma sample 402A and one or more neighboring luma samples 404X of the first luma sample 404A using a plurality of model parameters (e.g., $w_i$, $w_p$, $w_B$). In accordance with a determination that the MH-CCP mode is applied, the first chroma sample 402A is predicted according to the following model:

$$predChromaVal=\sum_{i=0}^{Num} w_i\cdot S_i+w_P\cdot P+w_B\cdot B \tag{1}$$

where predChromaVal is a predicted chroma value of the first chroma sample 402A; Num is a total number of neighboring luma samples 404X; $S_i$ is a luma value of the first luma sample 404A (where i is equal to 0) or a neighboring luma sample 404X (where i is greater than 0), which is indexed by i; P is a nonlinear element 416; B is an offset term; and $w_i$, $w_p$, $w_B$ are model parameters. In an example, the nonlinear element 416 (P) is equal to equal to (C×C+B)>>bit_depth, where bit_depth is the number of bits needed to represent luma samples of the current image frame 408 during encoding and decoding. In some embodiments, B is a median luma value, a middle luma value, or an average luma value of the luma samples 404 of the current coding block 406C. In another example, B is equal to 1<<(bit_depth−1).

In some embodiments, each of the one or more neighboring luma samples 404X of the first luma sample 404A is immediately adjacent to, and shares at least one respective side or vertex with, the first luma sample 404A. In some embodiments, the one or more neighboring luma samples 404X include a subset or all of a north neighboring luma sample (also called a top luma sample) 404N, a south neighboring luma sample (also called a bottom luma sample) 404S, a west neighboring luma sample (also called a left luma sample) 404 W, an east neighboring luma sample (also called a right luma sample) 404E, a northwest neighboring luma sample (also called a top left luma sample) 404NW, a southeast neighboring luma sample (also called a bottom right luma sample) 404SE, a southwest neighboring luma sample (also called a bottom left luma sample) 404SW, and a northeast neighboring luma sample (also called a top right luma sample) 404NE.

In some embodiments, equation (1) includes five terms, and represents a five tap model for determining the first chroma sample 402A of the current coding block 406C based on three linear terms (e.g., associated with the first luma sample 404A and neighboring luma samples 404W and 404E), the nonlinear element 416 (P), and the offset term B in the MH-CCP mode. Alternatively, in some embodiments, equation (1) includes seven terms, and represents a seven tap model for determining the first chroma sample 402A of the current coding block 406C based on three linear terms (e.g., associated with luma samples 404A, 404W, 404E, 404N, and 404S), the nonlinear element 416 (P), and the offset term B in the MH-CCP mode.

In some embodiments, luma samples 404 and chroma samples 402 of the current coding block have different resolutions corresponding to a chroma subsampling scheme (e.g., 4:2:2 or 4:2:0). Each luma sample 404 includes a downsampled luma sample generated from reconstructed luma samples using a downsampling filter. Alternatively, in some embodiments, each luma sample 404 includes an original or reconstructed luma sample without any downsampling. That said, the first luma sample 404A is reconstructed according to a resolution of luma samples or downsampled to a resolution of chroma sample, so are neighboring luma samples 404X (e.g., 404N, 404W, 404E, 404S, 404NW, 404NE, 404SW, 404SE) either reconstructed according to a resolution of luma samples or downsampled to a resolution of chroma sample.

In some embodiments, the plurality of model parameters $w_i$, $w_p$, and $w_B$ are determined based on a set of one or more reference luma samples 404R and a set of one or more co-located reference chroma samples 402R within a reference area 412 of the current coding block 406C. The reference area 412 is located in the current image frame 408. Further, in some embodiments, the reference luma samples 404R of the reference area 412 are combined to re-generate one or more chroma samples 402A based on equation (1). In some embodiments, the set of one or more co-located reference chroma samples 402R and the one or more re-generated chroma samples are compared to generate a least mean square (LMS) value. The plurality of model parameters $w_i$, $w_p$, $w_B$ are iteratively adjusted to reduce the LMS value, until the LMS value satisfies a predefined criterion (e.g., in which the LMS value is below a threshold LMS value or is minimized).

In some embodiments, the plurality of model parameters $w_i$, $w_p$, or $w_B$ are at least partially derived based on chroma samples and luma samples within the reference area 412 of the current coding block 406C, and the reference area 412 includes one or more coding blocks (e.g., coding blocks 412LT, 412T, 412RT, 412L, and 412LB) that are decoded prior to, the current coding block 406C. In some embodiments, a subset of the one or more coding blocks is immediately adjacent to the current coding block 406C. In some embodiments, a subset of the one or more coding blocks are separated from the current coding block 406C by one or more coding blocks. In some embodiments, the reference area 412 includes at least a portion of one or more rows above the current coding block 406C and/or a portion of one or more columns to the left of the current coding block 406C. For example, referring to FIG. 4, the reference area 412 includes seven rows of luma samples 404R above the current coding block 406C and nine columns of luma samples 404R to the left of the current coding block 406C. The reference area 412 may include a padded row and a padded column (e.g., shaded in FIG. 4).

In some embodiments, the model represented by equation (1) includes a plurality of nonlinear terms 414 having N+1 nonlinear terms, and a nonlinear prediction $w_p \cdot P$ is represented as follows:

$$w_P \cdot P = \sum_{i=0}^{N} w_{Pi} \cdot P_i \quad (2)$$

where $P_i$ represents a nonlinear term 414 indexed by i, and corresponds to a model parameter $w_{Pi}$. After the first luma sample 404A and one or more neighboring luma samples 404X are identified, the plurality of nonlinear terms 414 ($P_i$) are determined based on at least a subset of the first luma sample 404A and the one or more neighboring luma samples 404X. The first chroma sample 402A collocated with the first luma sample 404A are predicted in the current coding block based on the plurality of nonlinear terms 414 ($P_i$). In some embodiments, one of the nonlinear terms 414 ($P_i$) corresponds to an M-th power of a luma sample, where M is an integer greater than 1. Further, in some embodiments, the one of the nonlinear terms 414 ($P_i$) corresponds to the M-th power of a single luma sample. Alternatively, in some embodiments, the one of the nonlinear terms 414 ($P_i$) corresponds to a product of an m-th power of a first luma sample and an n-th power of a second luma sample, where m and n are positive integers and a sum of m and n is equal to M. In an example, M is equal to 2. In another example, M is equal to 3.

In some embodiments, the video bitstream 116 further includes a nonlinear usage syntax element 418 in addition to the first syntax element 420 associated with the MH-CCP mode. The nonlinear usage syntax element 418 indicates whether to use at least one nonlinear term 414 in the MH-CCP mode or whether to use more than one nonlinear term 414 in the MH-CCP mode.

Figure 5A:
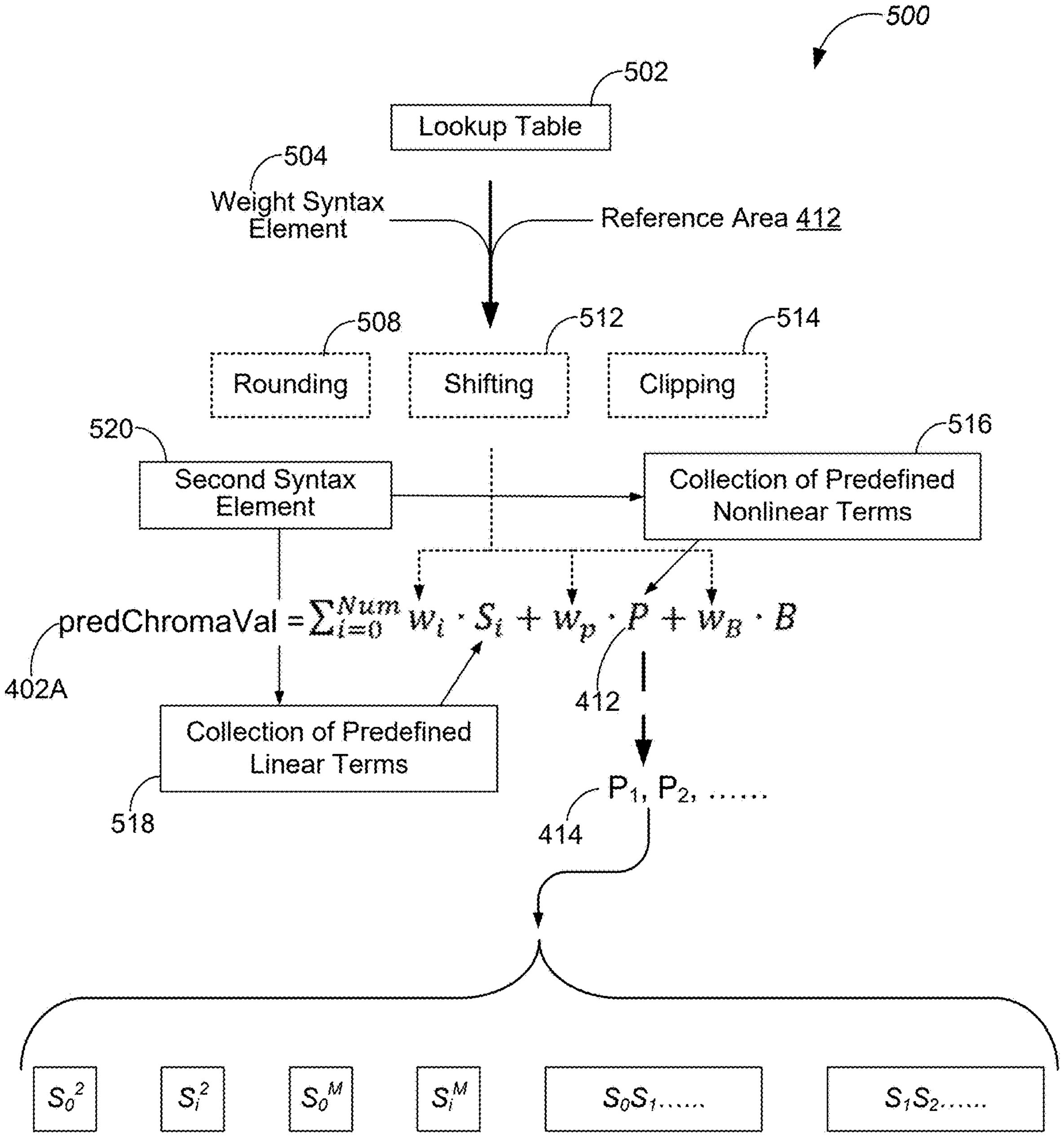
FIG. 5A illustrates an example process of predicting a first chroma sample based on a plurality of non-linear terms of one or more luma samples in an MH-CCP mode, in accordance with some embodiments.
Figure 5B:
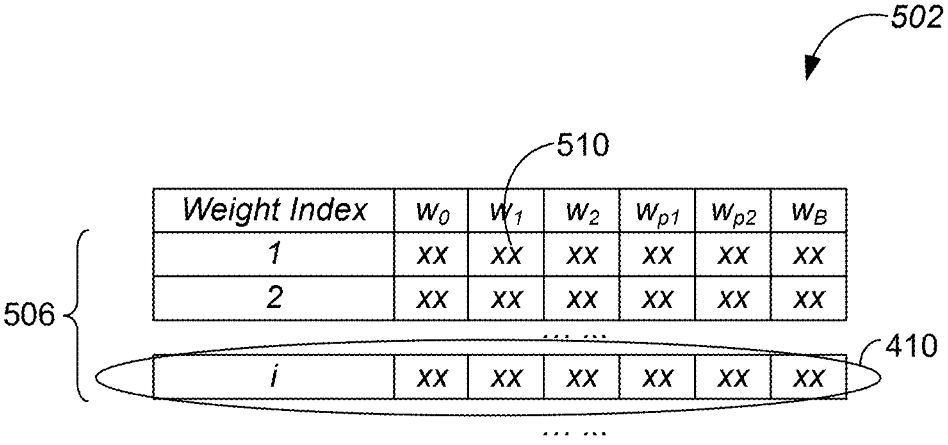
FIGS. 5B and 5C are two example lookup tables from which a plurality of model parameters are identified, in accordance with some embodiments.
Figure 5C:
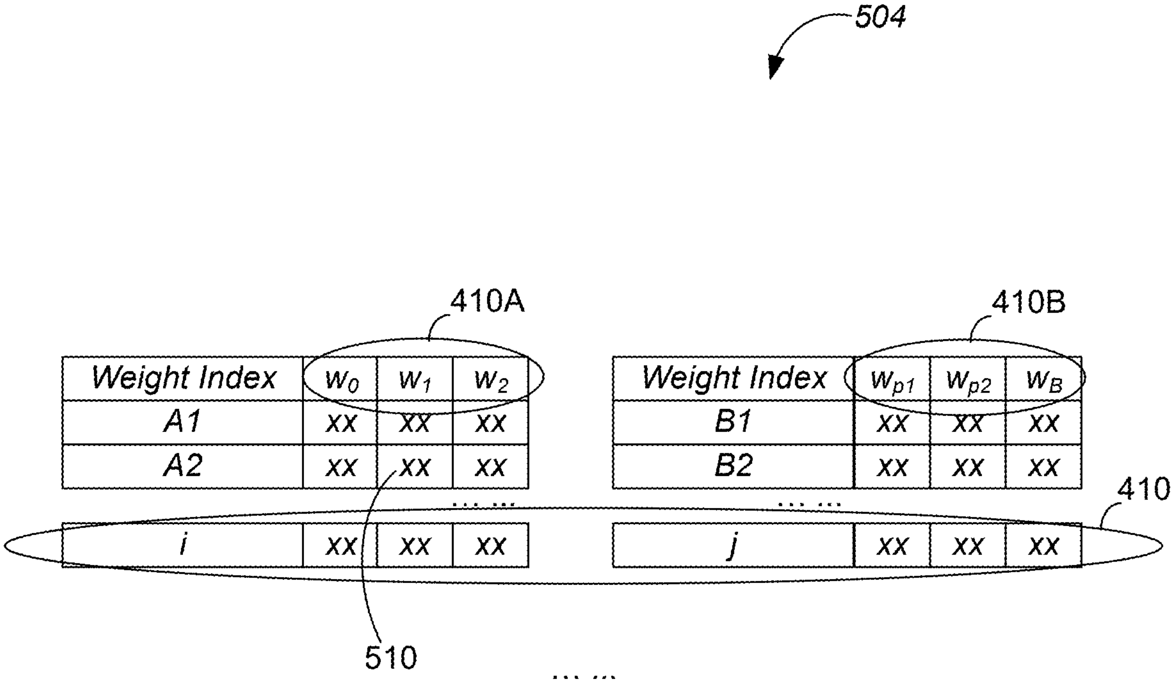

FIG. 5A illustrates an example process 500 of predicting a first chroma sample 402A based on a plurality of nonlinear terms 414 of one or more luma samples 404 in an MH-CCP mode, in accordance with some embodiments. FIGS. 5B and 5C are two example lookup tables 502 from which a plurality of model parameters 410 are identified, in accordance with some embodiments. The process 500 is implemented at a computing system (specifically, a decoder 122 of an electronic device 120 in FIG. 1). The computing system receives a video bitstream 116 including a current coding block 406C of a current image frame 408. The video bitstream 116 includes a first syntax element 420 for the MH-CCP mode. Based on the first syntax element 420, it is determined that the MH-CCP mode is enabled to reconstruct a first chroma sample 402A of the current coding block 406C based on at least a first luma sample 404A collocated with the first chroma sample 402A and associated neighboring luma samples 404X, the first luma sample. The first luma sample 404A and one or more neighboring luma samples 404X are identified in the current coding block 406C, and used to generate a plurality of nonlinear terms 414. The first chroma sample 402A is predicted based on the plurality of nonlinear terms 414, e.g., based on equations (1) and (2). The current image frame 408 including the current coding block 406C is reconstructed based on the first chroma sample 402A.

In some embodiments, each of the plurality of nonlinear terms 414 is one of a square of the first luma sample 404A (e.g., $S_0^2$), a square of a respective neighboring luma sample 404X (e.g., $S_i^2$, where i is a positive integer), the first luma sample 404A raised to an M-th power (e.g., $S_0^M$), where M is an integer greater than 2, the respective neighboring luma sample 404X raised to the M-th power (e.g., $S_i^M$), a product of the first luma sample 404A and a respective subset of one or more neighboring luma samples 404X, (e.g., $S_0S_1$, $S_0S_1S_2$), and a product of a respective subset of two or more neighboring luma samples 404X (e.g., $S_1S_2$, $S_1S_2S_3$).

In some embodiments, the computing system combines the plurality of nonlinear terms 414 and an offset term B to generate the first chroma sample 402A and excludes any linear term $S_i$ associated with the first luma sample 404A and the one or more neighboring luma samples 404X in generation of the first chroma sample 404A. For example, the plurality of nonlinear terms 414 and an offset term B are combined in a weighted manner to generate the first chroma sample 402A as follows:

$$predChromaVal = \sum_{i=0}^{N} w_{Pi} \cdot P_i + w_B \cdot B \quad (3)$$

where the offset term B is independent of any luma sample, and no linear term of the first luma sample 404A or neighboring luma samples 404X is applied to determine the first chroma sample 402A.

In some embodiments, the computing system combines a plurality of linear terms $S_i$ and the plurality of nonlinear terms 414 ($P_i$) to generate the first chroma sample 402A, where the offset term B is not applied to determine the first chroma sample 402A. Each linear term $S_i$ corresponds to a respective luma sample selected from a luma sample set including the first luma sample 404A and the one or more neighboring luma samples 404X. Further, in some embodiments, the plurality of linear terms $S_i$ and the plurality of nonlinear terms 414 ($P_i$) are combined based on a plurality of model parameters 410. The plurality of model parameters based on a lookup table 502, and the lookup table 502 includes one or more available model parameter values 510 for each of the linear terms $S_i$ and the nonlinear terms 414 ($P_i$).

Additionally, in some embodiments, the video bitstream 116 includes a weight syntax element 504 identifying a target weight index. Based on the weight syntax element 504, the plurality of model parameters 410 are selected from the lookup table 502, which maps a plurality of weight indexes to a plurality of model parameter sets. For example, referring to FIG. 5B, the plurality of model parameters 410 may be addressed as a whole, and the target weight index identifies one of a plurality of model parameter combinations 506 in the lookup table 502 as the plurality of model parameters 410. In another example, referring to FIG. 5C, the plurality of model parameters 410 may be addressed in subsets, and the lookup table 502 maps a first set of weight indexes to values of a first subset of model parameters 410A and a second set of weight indexes to a second subset of model parameters 410B. The target weight index includes two indictors for selecting values of the first subset of model parameters and values of the second subset of model parameters, respectively. The subsets of model parameters 410A and 410B shown in FIG. 5C are merely examples, and not intended to limit a combination of model parameters in each subset.

In some embodiments, the computing system identifies a reference area 412 corresponding to the current coding block 406C. Based on reference samples 402R and 404R of the reference area 412, each of the plurality of model parameters 410 is selected from the one or more available model parameter values (e.g., represented by “xx” in FIGS. 5B and 5C) in the lookup table 502. Further, in some embodiments, a least mean square (LMS) value is determined based on the samples 402A and 404A of the reference area 412, and the plurality of model parameters 410 are determined iteratively to reduce the LMS value until the LMS value satisfy a predefined criterion. More details on determination of the plurality of model parameters 410 are explained above with reference to FIG. 4.

Referring to FIG. 5A, in some embodiments, after determining the plurality of model parameters 410 based on the lookup table 502, the computing system applies at least one of a rounding operation 508, a shifting operation 512, and a clipping operation 514 to one of the plurality of model parameters 410 based on one or more predefined weighing thresholds.

In some embodiments, the computing system identifies a collection of predefined nonlinear terms 516 based on the first luma sample 404A and the one or more neighboring luma samples 404X, and selects the plurality of nonlinear terms 414 ($P_i$) from the collection of predefined nonlinear terms 516.

In some embodiments, the current image frame 408 further includes an alternative coding block 406A (FIG. 4) distinct from the current coding block 406C. When the MH-CCP mode is enabled for the alternative coding block 406A, an alternative chroma sample is located in the alternative coding block 406A, and predicted based on a plurality of alternative linear terms $S_i$ associated with an alternative luma sample 404A', which is collocated with the alternative chroma sample. Any nonlinear term 414 ($P_i$) associated with the alternative luma sample 404A' is excluded from determining the MH-CCP mode. In other words, the plurality of linear terms 414 and an offset term B are combined in a weighted manner to generate the alternative chroma sample as follows:

$$predChromaVal' = \sum_{i=0}^{Num} w_i \cdot S_i + w_B \cdot B \tag{4}$$

where predChromaVal' is a predicted chroma value of the alternative chroma sample, and the offset term B is independent of any luma sample. No nonlinear term 414 ($P_i$) of the alternative luma sample 404A' or neighboring luma samples is applied to determine the alternative chroma sample.

Referring to FIG. 5A, in some embodiments, the computing system identifies a collection of predefined nonlinear terms 516 and a collection of predefined linear terms 518 based on the first luma sample 404A and the one or more neighboring luma samples 404X. The video bitstream includes a second syntax element 520. When the second syntax element 520 has a first value indicating a first combination, a plurality of linear terms $S_i$ are selected from the collection of predefined linear terms 518, and the plurality of nonlinear terms 414 ($P_i$) are selected from the collection of predefined nonlinear terms 516. When the second syntax element 520 has a second value indicating a second combination, a plurality of linear terms $S_i$ are selected from the collection of predefined linear terms 518, and no nonlinear terms 414 ($P_i$) are selected from the collection of predefined nonlinear terms 516. When the second syntax element 520 has a third value indicating a third combination, no linear terms $S_i$ are selected from the collection of predefined linear terms 518, and the plurality of nonlinear terms 414 ($P_i$) are selected from the collection of predefined nonlinear terms 516. The plurality of nonlinear terms 414 ($P_i$), the plurality of linear terms $S_i$, or both are combined to generate the first chroma sample 402A. Further, in some embodiments, the second syntax element 520 is signaled at a coding block level, a superblock level, a tile level, a lice level, a frame level, or an image sequence level.

Figure 6:
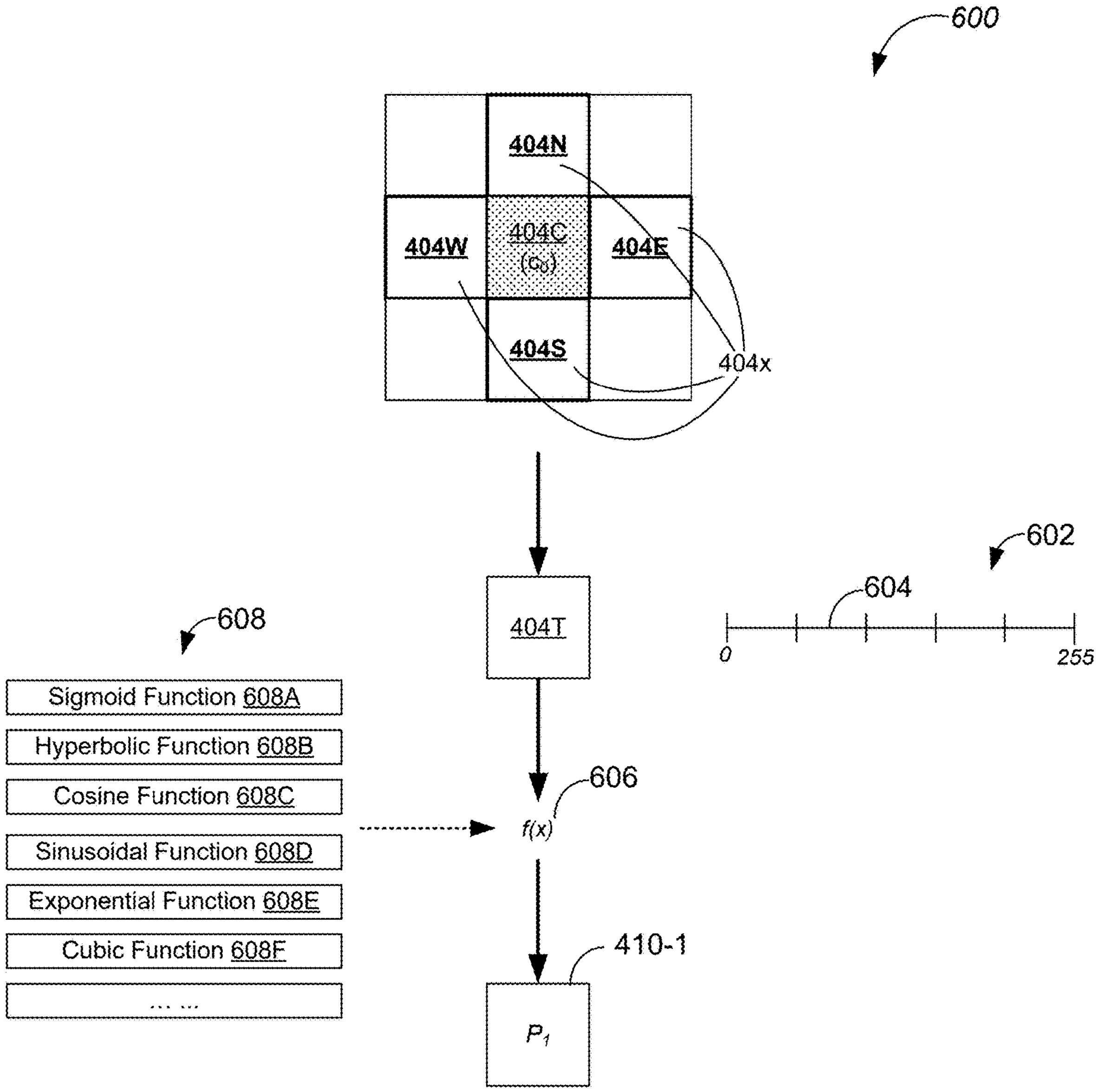
FIG. 6 illustrates another example process of predicting a first chroma sample 402A based on a plurality of non-linear terms of one or more luma samples in an MH-CCP mode, in accordance with some embodiments.

FIG. 6 illustrates another example process 600 of predicting a first chroma sample 402A based on a plurality of non-linear terms 414 ($P_i$) of one or more luma samples 404 in an MH-CCP mode, in accordance with some embodiments. The process 600 is implemented at a computing system (specifically, a decoder 122 of an electronic device 120 in FIG. 1). The computing system receives a video bitstream 116 including a current coding block 406C of a current image frame 408 and identifies a first luma sample 404A and one or more neighboring luma samples 404X in the current coding block 406C. A plurality of nonlinear terms 414 are generated based on the first luma sample 404A and one or more neighboring luma samples 404X. The first chroma sample 402A is predicted based on the plurality of nonlinear terms 414, e.g., based on equations (1) and (2).

In some embodiments, luma samples 404 of the current image frame 408 corresponds to a full scale range 602. If each of the luma samples 404 has 8 bits, then the full scale range 602 may be 0-255. In an example, the full scale range 602 is defined by a minimum value and a maximum value of the luma samples 404 of the current image frame 408. The full scale range 602 of luma samples 404 of the current image frame 408 is divided into a plurality of regions 604. For a first nonlinear term 410-1 (e.g., $P_1$), the computing system determines a respective target luma sample 404T based on the first luma sample 404A and the one or more neighboring luma samples 404X. The respective target luma sample 404T corresponds to a region of the plurality of regions 604. Based on the region of the respective target luma sample 404T, a subset of predefined functions 608 is selected to form the nonlinear function 606. For example, when the respective target luma sample 404T is in 0-127, the nonlinear function 606 is $\sin(S_0)$, where $S_0$ is the first luma sample 404A); and when the respective target luma sample 404T is in 128-255, the nonlinear function 606 is $\cos(S_0)$. In some embodiments, the nonlinear function 606 further includes a combination of the subset of predefined functions 608 and a linear function. For example, the nonlinear function 606 is represented as $\sin(S_0)+S_0$, which is applied to the respective target luma sample 404T to generate the first nonlinear term 410-1.

In some embodiments, for each nonlinear term 414 ($P_i$), the computing system determines the respective target luma sample 404T based on the first luma sample 404A and the one or more neighboring luma samples 404X. In some embodiments, the target luma sample 404T is selected from the first luma sample 404A and the one or more neighboring luma samples 404X. Alternatively, in some embodiments, the respective target luma sample 404T is determined based on a difference of the first luma sample 404A and one of the one or more neighboring luma samples 404X. In an example, the respective target luma sample 404T represents the difference of the first luma sample 404A and the one of the one or more neighboring luma samples 404X.

In some embodiments, the computing system applies at least one of a sigmoid function 608A, a hyperbolic function 608B, a cosine function 608C, a sinusoidal function 608D, an exponential function 608E, and a cubic function 608F to the respective target luma sample 404T. In an example, one of the plurality of nonlinear terms 414 ($P_i$) is the sigmoid function 608A of a luma sample 404 (e.g., $S_i$) represented as follows:

$$Pi = \frac{1}{1 - e^{-S_i}}. \quad (5)$$

In another example, one of the plurality of nonlinear terms 414 ($P_i$) is the hyperbolic function 608B of the target luma sample 404T (e.g., $S_i$) represented as follows:

$$Pi = \frac{e^{S_i} - e^{-S_i}}{e^{S_i} + e^{-S_i}}. \quad (6)$$

In yet another example, one of the plurality of nonlinear terms 414 ($P_i$) is represented as follows:

$$Pi = \frac{e^{S_1} - e^{-S_1}}{e^{S_0} + e^{-S_0}} \quad (7)$$

where $S_0$ and $S_i$ are the first luma sample 404A and an associated neighboring luma sample 404X (e.g., a left luma sample 404W), respectively. In some embodiments, one of the functions 608A-608F is applied on the respective target luma sample 404T (e.g., the first luma sample 404A, the respective target luma sample 404T).

Figure 7:
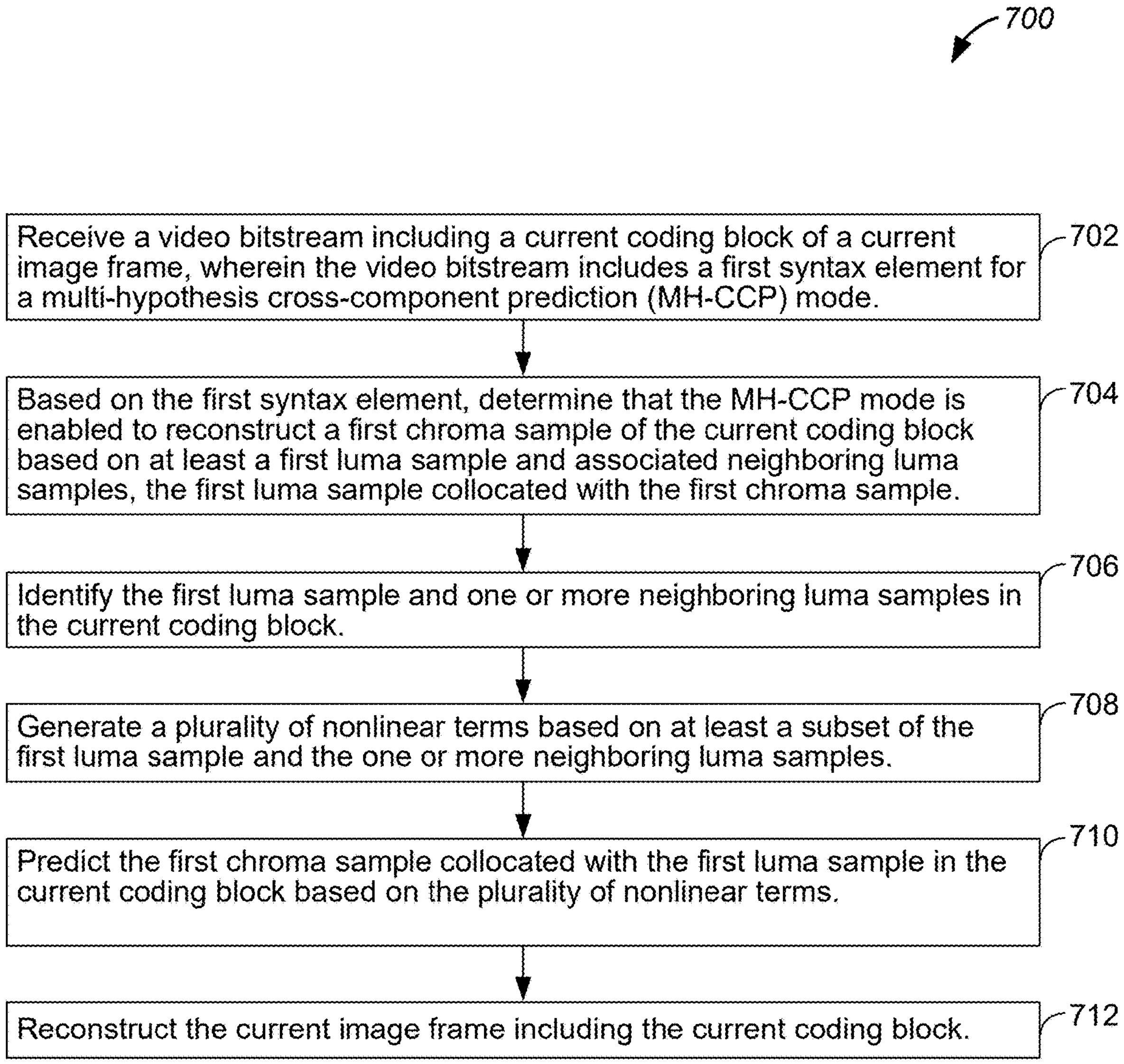
FIG. 7 is a flow diagram illustrating an example method of coding video, in accordance with some embodiments.

FIG. 7 is a flow diagram illustrating an example method 700 of decoding video, in accordance with some embodiments. The method 700 may be performed at a computing system (e.g., the server system 112, the source device 102, or the electronic device 120) having control circuitry and memory storing instructions for execution by the control circuitry. In some embodiments, the method 700 is performed by executing instructions stored in the memory (e.g., the memory 314) of the computing system. In some embodiments, the method 700 is applied jointly with one or more video codecs, including but not limited to, H.264, H.265/HEVC, H.266/VVC, AV1 and AVS/AVS2/AVS3. In some embodiments, a weighted sum of multiple versions of co-located luma samples 404A (FIG. 4) are used to predict the chroma values 402A in an MH-CCP mode. The multiple versions of co-located luma samples 404A are derived from either the co-located luma sample 404A, or the filtered co-located luma sample using neighboring luma samples 404X (e.g., 404W, 404N, 404E, 404S, 404NW, 404NE, 404SW, 404SE) as filtering inputs. Each input (e.g., corresponding a respective version of co-located luma samples) to the weighted sum is called a hypothesis. In some situations, values of reference luma samples 404R and reference chroma samples 402R are fed into the least mean square calculation kernel to derive model parameters 410 used in the MH-CCP mode. In some embodiments, a first luma sample 404A has eight neighbors 404X (FIG. 4) that are immediately adjacent to the first luma sample 404A. Further, in some embodiments, each luma sample 404 (e.g., 404A, 404X) includes a downsampled luma sample generated using a downsampling filter, when luma and chroma have different dimensions, e.g., 4:2:2 or 4:2:0. Alternatively, each luma sample 404 includes an original co-located luma sample without any downsampling.

In accordance with the method 700, a plural of nonlinear terms 414 of luma samples 404 are determined and applied to generate a first chroma sample 402A in an MH-CCP mode. A non-linear term 414 can be derived from a collocated sample of a first color component (e.g., a first luma sample 404A) and one or more associated neighboring samples (e.g., neighboring luma samples 404X) of the collocated sample. A sample of a second color component (e.g., a first chroma sample 402A) corresponds to the collocated sample of the first color component (e.g., a first luma sample 404A), and is determined using equation (1). In some embodiments, $w_{pi}$ is a model parameter of the non-linear term, and $P_i$ represents a nonlinear term 414 indexed by i. In some embodiments, each nonlinear term 414 ($P_i$) may include a neighboring sample of the first color component raised to an m-th power (e.g., $S_1^m$, where m is greater than 1), a collocated sample of the first color component raised to an n-th power (e.g., $S_0^n$, where n is greater than 1), a product of the collocated sample and at least one neighboring sample, or a product of two or more different neighboring samples. A nonlinear element 416 is a sum of the plurality of nonlinear terms 414 and is represented in equation (2).

Stated another way, in some embodiments, each nonlinear term 414 can be derived using a plurality of samples of the first color component (e.g., a plurality of luma samples 404), which includes one or more collocated samples of the first color components, one or more neighboring samples of the co-located sample, or a product thereof. An example of the resulting nonlinear element 416 is determined based on equation (2), where $P_i$ represents a nonlinear term 414 indexed by i, and corresponds to a model parameter $w_{Pi}$.

In some embodiments, the predicted sample of the second color component (e.g., the first chroma sample 402A) can be a combination of the plurality of non-linear terms 414 ($P_i$) and the offset term B. For example, the plurality of nonlinear terms 414 and an offset term B are combined in a weighted manner to generate the predicted sample of the second color component (e.g., the first chroma sample 402A) based on equation (3).

In some embodiments, the predicted sample of the second color component (e.g., the first chroma sample 402A) can be a combination of a plurality of linear terms $S_i$, the plurality of non-linear terms 414 ($P_i$) and the offset term B. In an example, when the MH-CCP mode is enabled, the first chroma sample 402A is predicted according to equation (1).

In some embodiments, a first combination of first of both non-linear terms 414 ($P_i$) and linear terms $S_i$ is used for a first set of coding blocks of the current image frame 408. Further, in some embodiments, in a second set of coding blocks of the current image frame, each sample of the second color component is determined based on a second combination of a subset of all available linear terms 518 (FIG. 5A) and the offset term B, excluding any nonlinear terms 414. Additionally, in some embodiments, in a third set of coding blocks of the current image frame 408, each sample of the second color component is determined based on a third combination of a subset of all available predefined non-linear terms 516 (FIG. 5A) and an offset term B, excluding any linear terms $S_i$. One or more syntax elements (e.g., the second syntax element 520) are signaled to indicate which one of the first, second, and third combinations is used for each associated coding block. The one or more syntax elements can be signaled on a coding block level, a superblock level, a tile level, an image slice level, on an image frame level, or on an image sequence level.

In some embodiments, one or more nonlinear functions are used to generate the non-linear terms 414 associated with the prediction samples of the second color component. For example, a nonlinear term 414 ($P_i$) is determined based on a sigmoid function of a luma sample 404 (e.g., $S_i$) represented in equation (5). In an example, a nonlinear term 414 ($P_i$) is determined based on a hyperbolic function of a luma sample 404 (e.g., $S_i$) represented in equation (6). In an example, one of a cosine function, a sinusoidal function, an exponential function, and a cubic function is used to determine the nonlinear term 414 ($P_i$). In an example, an input to the nonlinear term 414 ($P_i$) is a difference between the collocated sample and the neighboring samples (e.g. a difference of a first luma sample 404A and a left luma sample 404W). In yet another example, a piece-wise function is used based on a range of the input (which is also called the target luma sample 404T (FIG. 6).

In some embodiments, the model parameters 410 associated with different terms of the MH-CCP mode are signaled, derived from a plurality of predefined options, or derived based on the reference area 412. At least the model parameters $w_{pi}$ associated with the nonlinear terms 414 ($P_i$) can be stored in a lookup table 502. A target weight index identifies one or more model parameter values stored in the lookup table 502. The plurality of model parameters 410 are extracted from the lookup table 502 for use in determination of the samples of the second color component. In an example, the look up table 502 is built from one or more nonlinear functions, and can be rounded (operation 508), shifted (operation 512), or clipped (operation 514) using pre-defined threshold(s).

In some embodiments, a first nonlinear usage syntax element (e.g., syntax element 418 in FIG. 4) indicates whether at least one nonlinear term 414 ($P_i$) can be used in the MH-CCP mode. The first nonlinear usage syntax element may be signaled in high-level syntaxes, including but not limited to, sequence-level, picture-level, subpicture-level, slice-level, or tile-level flags. In some embodiments, a second nonlinear usage syntax element (e.g., syntax element 418 in FIG. 4) indicates whether more than one nonlinear term 414 ($P_i$) can be used in the MH-CCP mode. The second nonlinear usage syntax element may be signaled in high-level syntaxes, including but not limited to, sequence-level, picture-level, subpicture-level, slice-level, or tile-level flags.

Although FIG. 7 illustrates a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments.

(A1) In some implementations, a method 700 is implemented for decoding video data. The method 700 includes receiving (operation 702) a video bitstream including a current coding block of a current image frame, wherein the video bitstream includes a first syntax element for a multi-hypothesis cross-component prediction (MH-CCP) mode; based on the first syntax element, determining (operation 704) that the MH-CCP mode is enabled to reconstruct a first chroma sample of the current coding block based on at least a first luma sample and associated neighboring luma samples, the first luma sample collocated with the first chroma sample; identifying (operation 706) the first luma sample and one or more neighboring luma samples in the current coding block; generating (operation 708) a plurality of nonlinear terms based on at least a subset of the first luma sample and the one or more neighboring luma samples; predicting (operation 710) the first chroma sample collocated with the first luma sample in the current coding block based on the plurality of nonlinear terms; and reconstructing (operation 712) the current image frame including the current coding block.

(A2) In some embodiments of A1, each of the plurality of nonlinear terms includes one of: a square of the first luma sample; a square of a respective neighboring luma sample; the first luma sample raised to an M-th power, where M is an integer greater than 2; the respective neighboring luma sample raised to the M-th power; a product of the first luma sample and a respective subset of one or more neighboring luma samples; and a product of a respective subset of two or more neighboring luma samples.

(A3) In some embodiments of A2 or A3, predicting the first chroma sample further comprising: combining the plurality of nonlinear terms and an offset term to generate the first chroma sample.

(A4) In some embodiments of any of A1-A3, predicting the first chroma sample further comprises: combining a plurality of linear terms and the plurality of nonlinear terms to generate the first chroma sample, each linear term corresponding to a respective luma sample selected from a luma sample set including the first luma sample and the one or more neighboring luma samples.

(A5) In some embodiments of A4, the plurality of linear terms and the plurality of nonlinear terms are combined based on a plurality of model parameters, and the method further comprises determining the plurality of model parameters based on a lookup table, the lookup table including one or more available model parameter values for each of the linear terms and the nonlinear terms.

(A6) In some embodiments of A5, the video bitstream includes a weight syntax element identifying a target weight index, and determining the plurality of model parameters further comprises: based on the weight syntax element, selecting the plurality of model parameters from the lookup table, the lookup table mapping a plurality of weight indexes to a plurality of model parameter sets.

(A7) In some embodiments of A5, determining the plurality of model parameters further comprises: identifying a reference area corresponding to the current coding block; and based on samples of the reference area, selecting each of the plurality of model parameters from the one or more available model parameter values in the lookup table.

(A8) In some embodiments of A7, selecting each of the plurality of model parameters further comprises: determining a least mean square (LMS) value based on the samples of the reference area; wherein the plurality of model parameters are determined iteratively to reduce the LMS value until the LMS value satisfy a predefined criterion.

(A9) In some embodiments of any of A5-A8, the method 700 further comprises, after determining the plurality of model parameters based on the lookup table, applying a rounding, shifting, or clipping operation to one of the plurality of model parameters based on one or more predefined weighing thresholds.

(A10) In some embodiments of any of A1-A9, generating the plurality of nonlinear terms further comprises: identifying a collection of predefined nonlinear terms based on the first luma sample and the one or more neighboring luma samples; and selecting the plurality of nonlinear terms from the collection of predefined nonlinear terms.

(A11) In some embodiments of any of A1-A10, predicting the first chroma sample further comprises: combining the plurality of nonlinear terms and an offset term to generate the first chroma sample; and excluding any linear term associated with the first luma sample and the one or more neighboring luma samples in generation of the first chroma sample.

(A12) In some embodiments of any of A1-A11, the current image frame includes an alternative coding block distinct from the current coding block, and the method further comprising, when the MH-CCP mode is enabled for the alternative coding block: predicting an alternative chroma sample in the alternative coding block based on a plurality of alternative linear terms associated with an alternative luma sample, which is collocated with the alternative chroma sample, including excluding any nonlinear term associated with the alternative luma sample.

(A13) In some embodiments of any of A1-A12, the method 700 further comprises identifying a collection of predefined nonlinear terms and a collection of predefined linear terms based on the first luma sample and the one or more neighboring luma samples; wherein the video bitstream includes a second syntax element; wherein based on the second syntax element, a plurality of linear terms are selected from the collection of predefined nonlinear terms, and the plurality of nonlinear terms are selected from the collection of predefined nonlinear terms; and wherein predicting the first chroma sample further comprises combining the plurality of nonlinear terms and the plurality of linear terms to generate the first chroma sample.

(A14) In some embodiments of A13, the second syntax element is signaled at a coding block level, a superblock level, a tile level, a lice level, a frame level, or an image sequence level.

(A15) In some embodiments of any of A1-A14, generating a plurality of nonlinear terms further comprises, for each nonlinear term: determining a respective target luma sample based on the first luma sample and the one or more neighboring luma samples; and applying at least one of a sigmoid function, a hyperbolic function, a cosine function, a sine function, an exponential function, and a cubic function to the respective target luma sample.

(A16) In some embodiments of A15, determining a respective target luma sample further comprises: selecting the respective target luma sample from the first luma sample and the one or more neighboring luma samples.

(A17) In some embodiments of A15, determining a respective target luma sample further comprises: determining the respective target luma sample based on a difference of the first luma sample and one of the one or more neighboring luma samples.

(A18) In some embodiments of any of A1-A17, the method further comprises dividing a full scale range of luma samples of the current image frame into a plurality of regions, wherein generating a plurality of nonlinear terms further comprises, for a first nonlinear term: determining a respective target luma sample based on the first luma sample and the one or more neighboring luma samples; based on a region of the respective target luma sample, selecting a subset of predefined functions; and applying the subset of predefined functions to the respective target luma sample to generate the first nonlinear term.

(A19) In some embodiments of any of A1-A18, a first nonlinear usage syntax element is signaled in the video bitstream at one of a block level, a superblock level, an image frame level, a slice level, a tile level, and an image sequence level for the current coding block, the nonlinear usage syntax element indicating whether to use at least one nonlinear term in the MH-CCP mode.

(A20) In some embodiments of any of A1-A19, the video bitstream further includes a second nonlinear usage syntax element in addition to the first syntax element associated with the MH-CCP mode, the second nonlinear usage syntax element indicating whether to use more than one nonlinear term in the MH-CCP mode.

(A21) In some embodiments, a method includes receiving video data comprising a current coding block of a current image frame; encoding the current image frame; transmitting the encoded current image frame via a video bitstream; and signaling, via the video bitstream, a first syntax element for a multi-hypothesis cross-component prediction (MH-CCP) mode indicating whether to reconstruct a first chroma sample of the current coding block based on a first luma sample and associated neighboring luma samples, the first luma sample collocated with the first chroma sample; wherein when the MH-CCP mode is enabled, a plurality of nonlinear terms are determined based on at least a subset of the first luma sample and one or more neighboring luma samples of the first luma sample, and the first chroma sample collocated with the first luma sample is predicted based on the plurality of nonlinear terms.

(A22) In some embodiments of A21, the method is implemented to enable the features of any of A2-A20.

(A23) In some embodiments, a method includes obtaining a source video sequence including a current image frame having a current coding block; and performing a conversion between the source video sequence and a video bitstream, wherein the video bitstream comprises: the current image frame having the current coding block; and a first syntax element for a multi-hypothesis cross-component prediction (MH-CCP) mode indicating whether to reconstruct a first chroma sample of the current coding block based on a first luma sample and associated neighboring luma samples, the first luma sample collocated with the first chroma sample; wherein when the MH-CCP mode is enabled, a plurality of nonlinear terms are determined based on at least a subset of the first luma sample and one or more neighboring luma samples of the first luma sample, and the first chroma sample collocated with the first luma sample is predicted based on the plurality of nonlinear terms.

(A24) In some embodiments of A23, the method is implemented to enable the features of any of A2-A20.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A24 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A24 above).

Unless otherwise specified, any of the syntax elements described herein may be high-level syntax (HLS). As used herein, HLS is signaled at a level that is higher than a block level. For example, HLS may correspond to a sequence level, a frame level, a slice level, or a tile level. As another example, HLS elements may be signaled in a video parameter set (VPS), a sequence parameter set (SPS), a picture parameter set (PPS), an adaptation parameter set (APS), a slice header, a picture header, a tile header, and/or a CTU header.

It will be understood that, although the terms "first," "second," etc. may be used herein to describe various elements, these elements should not be limited by these terms. These terms are only used to distinguish one element from another. The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method for decoding video data, comprising:

receiving a video bitstream including a current coding block of a current image frame, wherein the video bitstream includes a first syntax element for a multi-hypothesis cross-component prediction (MH-CCP) mode;

based on the first syntax element, determining that the MH-CCP mode is enabled to reconstruct a first chroma sample of the current coding block based on at least a first luma sample and associated neighboring luma samples, the first luma sample collocated with the first chroma sample;

identifying the first luma sample and one or more neighboring luma samples in the current coding block;

generating a plurality of nonlinear terms based on at least a subset of the first luma sample and the one or more neighboring luma samples, the generating comprising:

identifying a collection of predefined nonlinear terms based on the first luma sample and the one or more neighboring luma samples; and selecting the plurality of nonlinear terms from the collection of predefined nonlinear terms;

predicting the first chroma sample collocated with the first luma sample in the current coding block based on the plurality of nonlinear terms; and reconstructing the current image frame including the current coding block.

2. The method of claim 1, wherein each of the plurality of nonlinear terms includes one of:

a square of the first luma sample;

a square of a respective neighboring luma sample;

the first luma sample raised to an M-th power, where M is an integer greater than 2;

the respective neighboring luma sample raised to the M-th power;

a product of the first luma sample and a respective subset of the one or more neighboring luma samples; and a product of a respective subset of two or more neighboring luma samples.

3. The method of claim 1, wherein predicting the first chroma sample further comprising:

combining the plurality of nonlinear terms and an offset term to generate the first chroma sample.

4. The method of claim 1, wherein predicting the first chroma sample further comprises:

combining a plurality of linear terms and the plurality of nonlinear terms to generate the first chroma sample, each linear term corresponding to a respective luma sample selected from a luma sample set including the first luma sample and the one or more neighboring luma samples.

5. The method of claim 4, wherein the plurality of linear terms and the plurality of nonlinear terms are combined based on a plurality of model parameters, and the method further comprises determining the plurality of model parameters based on a lookup table, the lookup table including one or more available model parameter values for each of the linear terms and the nonlinear terms.

6. The method of claim 5, wherein the video bitstream includes a weight syntax element identifying a target weight index, and determining the plurality of model parameters further comprises:

based on the weight syntax element, selecting the plurality of model parameters from the lookup table, the lookup table mapping a plurality of weight indexes to a plurality of model parameter sets.

7. The method of claim 5, wherein determining the plurality of model parameters further comprises:

identifying a reference area corresponding to the current coding block; and based on samples of the reference area, selecting each of the plurality of model parameters from the one or more available model parameter values in the lookup table.

8. The method of claim 7, wherein selecting each of the plurality of model parameters further comprises:

determining a least mean square (LMS) value based on the samples of the reference area;

wherein the plurality of model parameters are determined iteratively to reduce the LMS value until the LMS value satisfy a predefined criterion.

9. The method of claim 5, further comprising, after determining the plurality of model parameters based on the lookup table, applying a rounding, shifting, or clipping operation to one of the plurality of model parameters based on one or more predefined weighing thresholds.

10. The method of any claim 1, wherein predicting the first chroma sample further comprises:

combining the plurality of nonlinear terms and an offset term to generate the first chroma sample; and excluding any linear term associated with the first luma sample and the one or more neighboring luma samples in generation of the first chroma sample.

11. The method of any claim 1, wherein the current image frame includes an alternative coding block distinct from the current coding block, and the method further comprising, when the MH-CCP mode is enabled for the alternative coding block:

predicting an alternative chroma sample in the alternative coding block based on a plurality of alternative linear terms associated with an alternative luma sample, which is collocated with the alternative chroma sample, including excluding any nonlinear term associated with the alternative luma sample.

12. The method of claim 1, further comprising:

identifying a collection of predefined linear terms based on the first luma sample and the one or more neighboring luma samples;

wherein the video bitstream includes a second syntax element;

wherein based on the second syntax element, a plurality of linear terms are selected from the collection of predefined nonlinear terms, and the plurality of nonlinear terms are selected from the collection of predefined nonlinear terms; and wherein predicting the first chroma sample further comprises combining the plurality of nonlinear terms and the plurality of linear terms to generate the first chroma sample.

13. The method of claim 12, wherein the second syntax element is signaled at a coding block level, a superblock level, a tile level, a lice level, a frame level, or an image sequence level.

14. The method of claim 1, wherein generating a plurality of nonlinear terms further comprises, for each nonlinear term:

determining a respective target luma sample based on the first luma sample and the one or more neighboring luma samples; and applying at least one of a sigmoid function, a hyperbolic function, a cosine function, a sine function, an exponential function, and a cubic function to the respective target luma sample.

15. The method of claim 14, wherein determining a respective target luma sample further comprises:

selecting the respective target luma sample from the first luma sample and the one or more neighboring luma samples.

16. The method of claim 14, wherein determining a respective target luma sample further comprises:

determining the respective target luma sample based on a difference of the first luma sample and one of the one or more neighboring luma samples.

17. The method of claim 1, further comprising dividing a full scale range of luma samples of the current image frame into a plurality of regions, wherein generating a plurality of nonlinear terms further comprises, for a first nonlinear term:

determining a respective target luma sample based on the first luma sample and the one or more neighboring luma samples;

based on a region of the respective target luma sample, selecting a subset of predefined functions; and applying the subset of predefined functions to the respective target luma sample to generate the first nonlinear term.

18. The method of claim 1, wherein a first nonlinear usage syntax element is signaled in the video bitstream at one of a block level, a superblock level, an image frame level, a slice level, a tile level, and an image sequence level for the current coding block, the nonlinear usage syntax element indicating whether to use at least one nonlinear term in the MH-CCP mode.

19. The method of claim 1, wherein the video bitstream further includes a second nonlinear usage syntax element in addition to the first syntax element associated with the MH-CCP mode, the second nonlinear usage syntax element indicating whether to use more than one nonlinear term in the MH-CCP mode.

20. A computing system, comprising:

control circuitry; and memory storing one or more programs configured to be executed by the control circuitry, the one or more programs further comprising instructions for:

receiving video data comprising a current coding block of a current image frame;

encoding the current image frame;

generating a first syntax element for a multi-hypothesis cross-component prediction (MH-CCP) mode indicating whether to reconstruct a first chroma sample of the current coding block based on a first luma sample and associated neighboring luma samples, the first luma sample collocated with the first chroma sample; and when the MH-CCP mode is enabled, determining a plurality of nonlinear terms based on at least a subset of the first luma sample and one or more neighboring luma samples of the first luma sample, and predicting the first chroma sample collocated with the first luma sample based on the plurality of nonlinear terms; and wherein determining the plurality of nonlinear terms comprises (i) identifying a collection of predefined nonlinear terms based on the first luma sample and the one or more neighboring luma samples, and (i) selecting the plurality of nonlinear terms from the collection of predefined nonlinear terms.

21. A non-transitory computer-readable storage medium storing one or more instructions and a video bitstream that is generated by a video encoding method, the one or more instructions when executed by a processor, cause a computing system to perform the video encoding method, the video encoding method comprising:

encoding a current image frame of video data;

generating a first syntax element for a multi-hypothesis cross-component prediction (MH-CCP) mode indicating whether to reconstruct a first chroma sample of the current coding block based on a first luma sample and associated neighboring luma samples, the first luma sample collocated with the first chroma sample;

when the MH-CCP mode is enabled:

determining a plurality of nonlinear terms based on at least a subset of the first luma sample and one or more neighboring luma samples of the first luma sample, and predicting the first chroma sample collocated with the first luma sample based on the plurality of nonlinear terms; and transmitting the video bitstream including the encoded current image frame and the first syntax element;

wherein determining the plurality of nonlinear terms comprises (i) identifying a collection of predefined nonlinear terms based on the first luma sample and the one or more neighboring luma samples, and (i) selecting the plurality of nonlinear terms from the collection of predefined nonlinear terms.

22. The computing system of claim 20, wherein predicting the first chroma sample comprises:

combining a plurality of linear terms and the plurality of nonlinear terms to generate the first chroma sample, each linear term corresponding to a respective luma sample selected from a luma sample set including the first luma sample and the one or more neighboring luma samples.

* * * * *